United States Patent [19]
O'Neill

[11] Patent Number: 5,375,007
[45] Date of Patent: Dec. 20, 1994

[54] OPTICAL DISTRIBUTION SYSTEM

[75] Inventor: Frank P. O'Neill, Richland Hills, Tex.

[73] Assignee: Motorola, Inc., Schaumburg, Ill.

[21] Appl. No.: 99,641

[22] Filed: Jul. 30, 1993

Related U.S. Application Data

[62] Division of Ser. No. 807,317, Dec. 16, 1991, abandoned.

[51] Int. Cl.5 ............................................. H04B 10/24
[52] U.S. Cl. ..................... 359/152; 359/113; 455/82
[58] Field of Search ............... 359/152, 153, 158, 113, 359/114; 455/76, 82

[56] References Cited

U.S. PATENT DOCUMENTS

| | | | |
|---|---|---|---|
| 4,928,317 | 5/1990 | Franchini | 359/145 |
| 5,081,706 | 1/1992 | Kim | 455/78 |
| 5,142,551 | 8/1992 | Borth | 455/76 |
| 5,159,479 | 10/1992 | Takagi | 359/152 |
| 5,175,872 | 12/1992 | Borras | 455/76 |

FOREIGN PATENT DOCUMENTS 0194541  11/1984  Japan .................................. 359/152

*Primary Examiner*—Leslie Pascal
*Attorney, Agent, or Firm*—Raymond J. Warren

[57] ABSTRACT

A downlink portion consists of a multiplexer for combining several signals. The combined signal is converted to an optical signal by a laser and transmitted over an optical line to a splitter. The split signals are each transmitted to a detector which converts the optical signals back into an electrical signal. The electrical signal is then filtered to provide the desired signal from the combined signal. The desired signal is then transmitted. The uplink portion consists of a plurality of receivers which receive signals from remote units. The received signals are multiplexed and converted to optical signals in a laser. The optical signals are transmitted over optical lines to a combiner which provides a single combined optical signal. The combined optical signal is then transmitted over optical lines to a detector which converts the optical signals to an electrical signal. The electrical signal is then demultiplexed into its constituent portions.

10 Claims, 5 Drawing Sheets

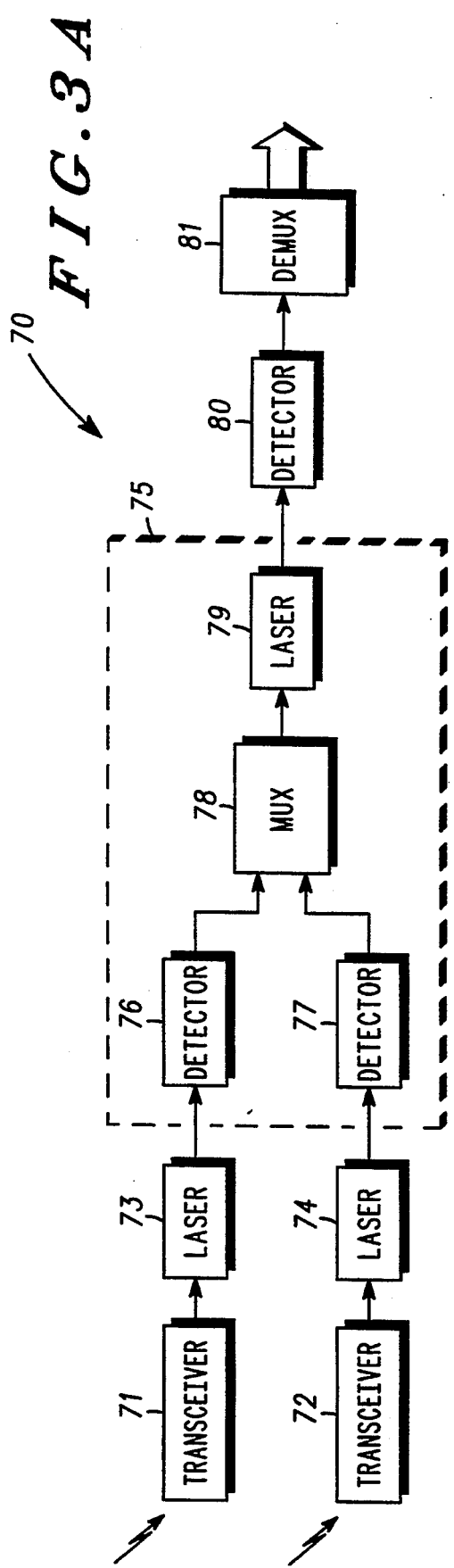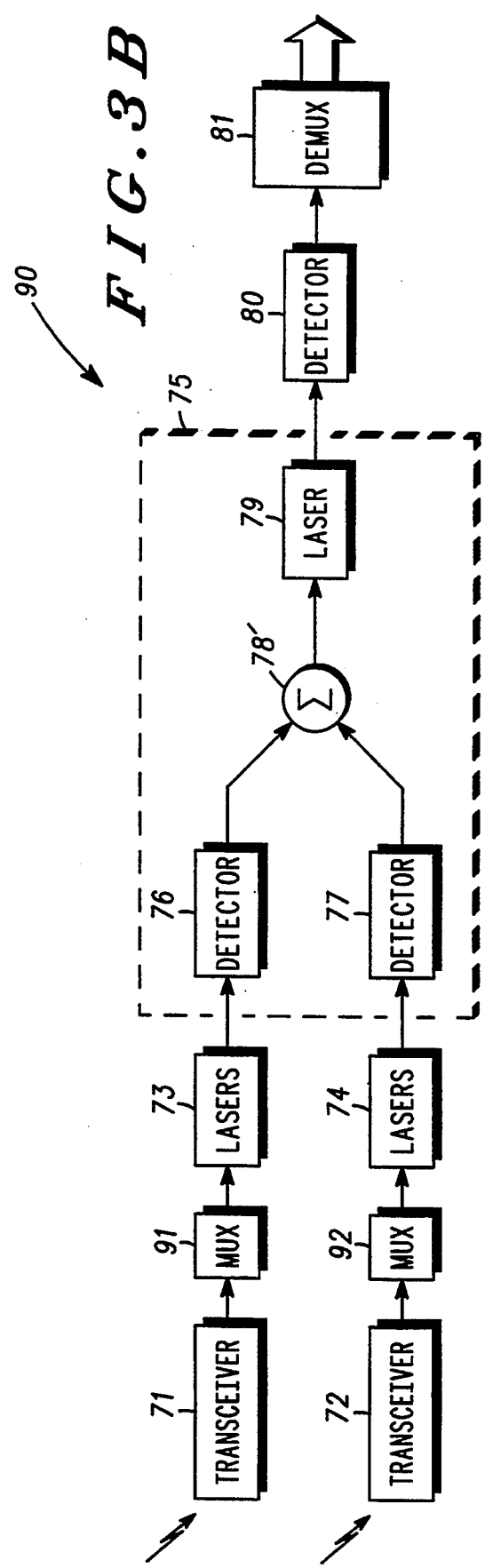

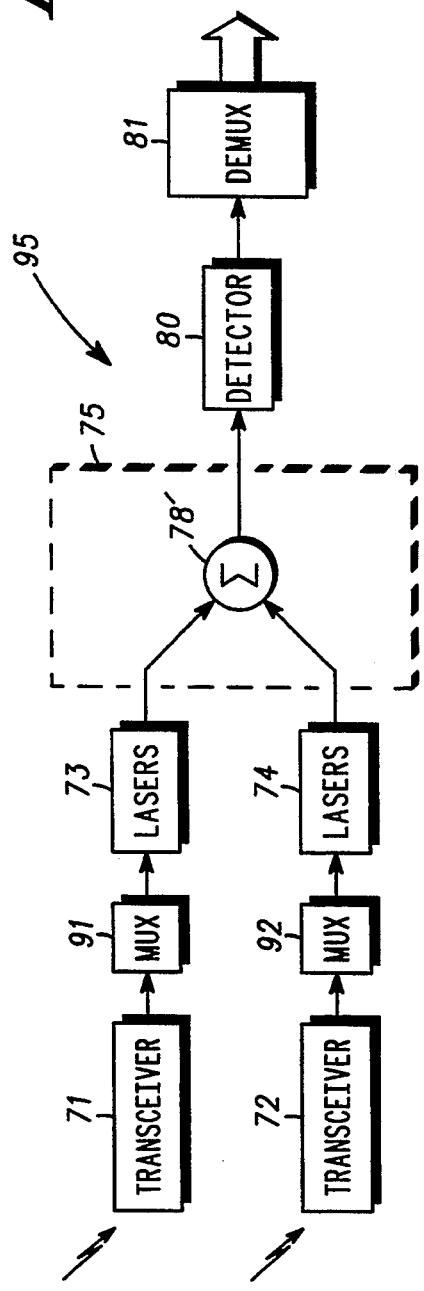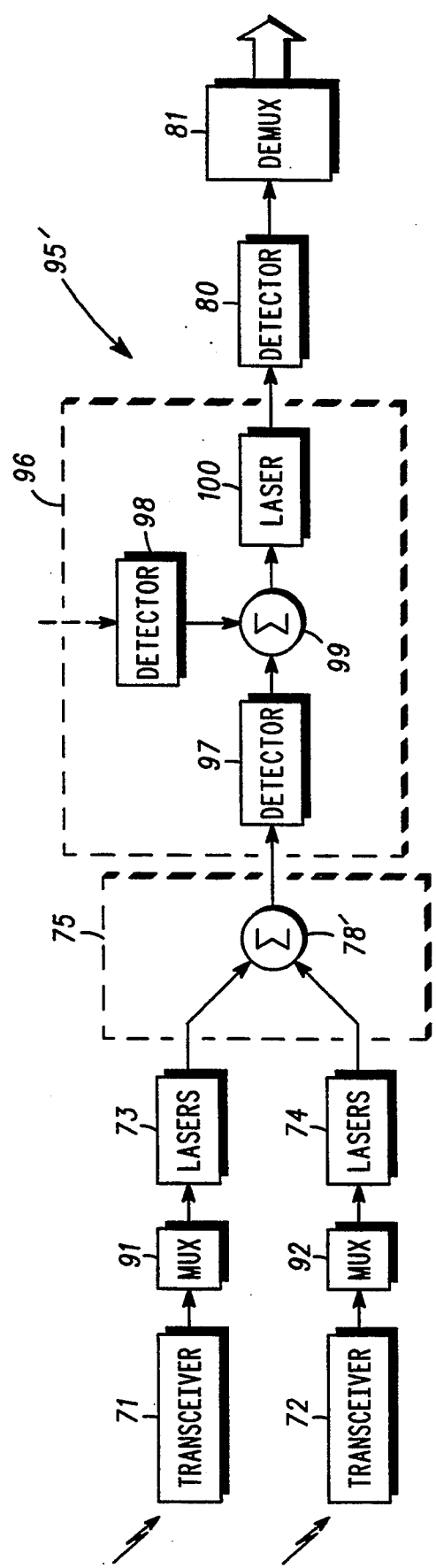

OPTICAL DISTRIBUTION SYSTEM

This is a division of copending application Ser. No. 07/807,317 filed on Dec. 16, 1991, now abandoned.

FIELD OF THE INVENTION

The present invention relates, in general, to communication systems and, more particularly, to optical distribution systems.

BACKGROUND OF THE INVENTION

One of the problems facing cellular providers in establishing a cellular communication network, is the cost and acquisition of facilities. Site acquisition for the transmission and switching hardware can account for half or more of the total cost of establishing a new cell site in a metropolitan area.

SUMMARY OF THE INVENTION

The present invention provides an optical distribution system which permits multiple cells of a communication network to be covered by one centralized base station.

The downlink portion of the optical distribution system consists of a multiplexing means for combining a plurality of signals into a combined output signal. The combined output signal is forwarded to a first transducer means for converting the combined output signal to an optical signal. The optical signal from the first transducer means is then transmitted over a first optical line to a first splitting means for splitting the optical signal into a plurality of optical signals. Each of the plurality of optical signals are transmitted to a plurality of first detector means over a plurality of second optical links. The first detector means are used to convert the optical signals back into combined signals. Each combined RF signal is then transmitted to one of a plurality of first converting means for isolating a first desired signal from the combined signal. The desired signal is then transmitted using a transmitting means.

The uplink portion of the optical distribution system consists of a plurality of receiving means which receive RF signals from remote units. The received signals are then multiplexed, by either time or frequency, and converted to optical signals in a plurality of lasers. The optical signals are transmitted over optical lines to a combining means which combines the individual optical signals into a single combined optical signal. The combined optical signal is then transmitted over optical lines to a detecting means which converts optical signals to electrical signals. The electrical signal is then demultiplexed into its constituent portions.

In an alternative uplink portion, the individual optical signals may be converted to electrical signals before combining and converted back to optical signals after combining.

In another alternative uplink portion, a single multiplexer may be provided as the combining means. This would eliminate the need for multiplexers coupled to each receiving means and require additional detecting means prior to the multiplexer to convert the optical signals to electrical before multiplexing.

BRIEF DESCRIPTION OF THE DRAWINGS

FIGS. 3A-3D are block diagrams of an optical communication uplink embodying the present invention;

DESCRIPTION OF A PREFERRED EMBODIMENT

By transporting RF channels from one centralized base station to a group of smaller antenna sites, the cost of the cell site can be reduced. However, once the decision to decentralize has been made, a distribution network must be established. From a functional standpoint, a tree-branch network would be preferable. This can be accomplished using the tree-branch right-of-ways presently utilized by utility companies.

Figure 1:
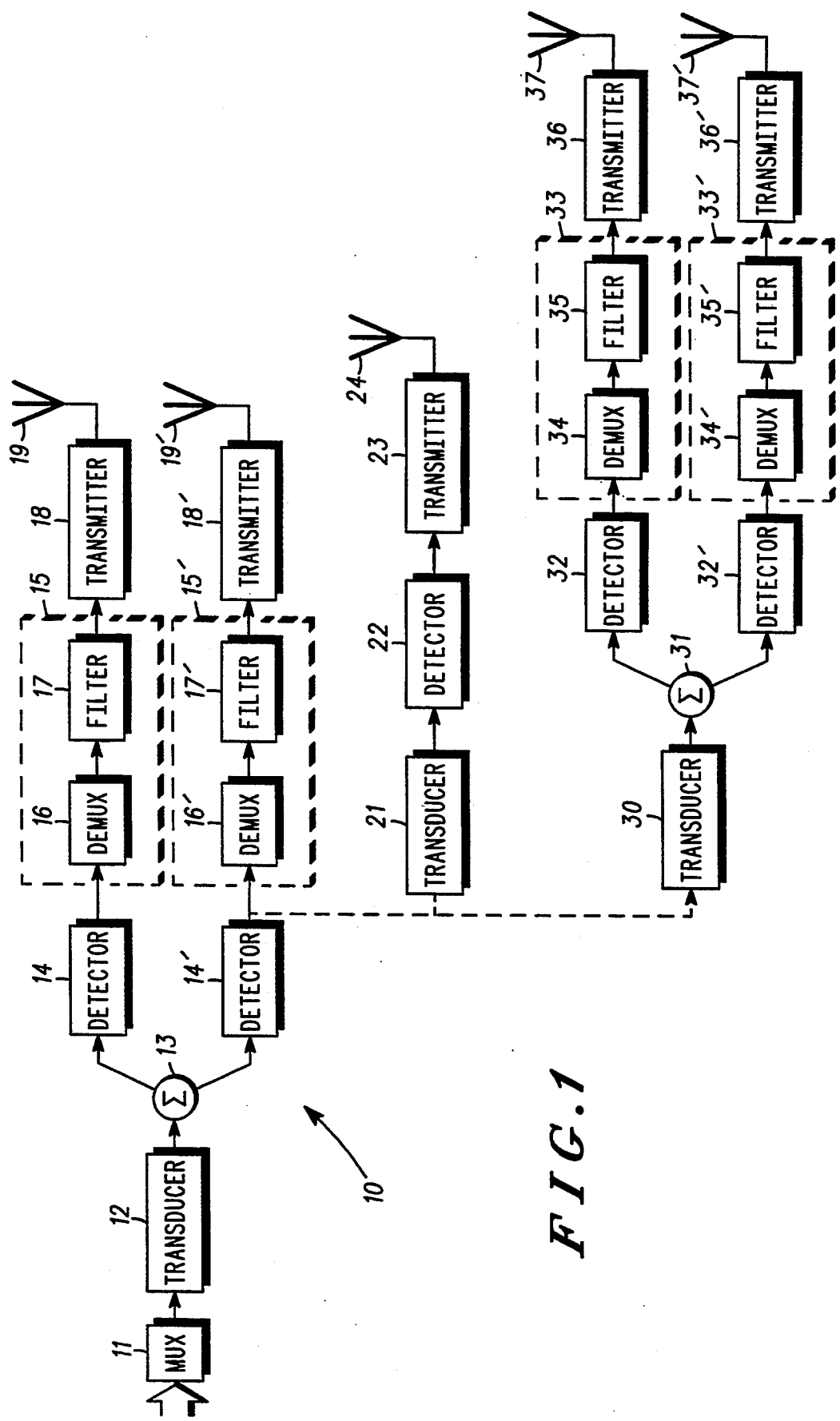
FIG. 1 is a block diagram of an optical communication downlink embodying the present invention.

Referring initially to FIG. 1, a block diagram of an optical communication downlink, generally designated 10, is illustrated. As shown, downlink 10 utilizes the tree-branch network where optical splitters (13 and 31) are used to branch the optical signal. It should be understood that while dual output splitters are illustrated, there are splitters available which can split an input optical signal into more than two output signals.

In operation, downlink 10 receives a plurality of inputs at a multiplexer 11. Input signals received by multiplexer 11 are combined in a Frequency Division Multiplexed (FDM) format and transmitted individually to a transducer 12. In the present embodiment, transducer 12 is a laser and converts an electrical input signal into a light output signal. The light signal is then transmitted to a splitter 13 where it is divided into two or more like signals.

Each light signal from splitter 13 is then transmitted along an optic conductor to a detector 14. Detector 14 receives the optic signal and converts it back to an electrical signal. This electrical signal is then forwarded to converter 15. Converter 15 consists of a demultiplexer 16 and a filter 17. Converter 15 serves to separate a single desired signal from the plurality of signals received at converter 15. The filtered signal is then forwarded to a transmitter 18 where it is broadcast to a remote unit using antenna 19.

In addition to the above, the downlink may be expanded to include a second laser 21, shown here receiving an output from detector 14'. Laser 21 again converts the signal into an optical signal which is forwarded to detector 22. Detector 22 converts the signal back to an electrical signal which is then passed to a transmitter 23 for broadcast using an antenna 24. In this portion of the downlink, the entire signal is broadcast. Therefore, there is no need for a converter similar to converter 15.

The downlink may be further expanded by adding additional branches. This is represented in FIG. 1 by the inclusion of blocks 30 through 37 and 37'. The electrical output signal of detector 14' is converted into an optic signal by laser 30. This signal is then divided in splitter 31. Each of the output signals from splitter 31 is then forwarded to a detector 32 (32'). Detector 32 (32') converts the optic signal back into an electrical signal. The electrical signal is then processed in converter 33 (33'), consisting of a demultiplexer 34 (34') and a filter 35 (35'). The output from converter 33 (33') is then passed to transmitter 36 (36') where it is broadcast using antenna 37 (37').

This process may be repeated as long as the quality of the signal is not degraded below a level which would result in an unacceptable communication. As illustrated, the downlink is a tree-branch network design which would be compatible with existing utility company right-of-ways. This is possible through the use of high linearity lasers which can be cascaded two or more times. The ability to cascade the laser signals, as done with splitters 13 and 31, reduces the laser cost by requiring fewer lasers.

The number of lasers on the downlink side per site can be as few as 1/n where n is the number of split signals produces by the splitters. This assumes that each splitter produces the same number of outputs. With splitters providing two output signals (n=2), the above equation would result in 0.5 lasers required per site. As shown in FIG. 1, discounting laser 21 as a special case, there are four cell sites (19, 19', 37 and 37') served by two lasers (12 and 30), or 0.5 lasers per site.

Figure 2:
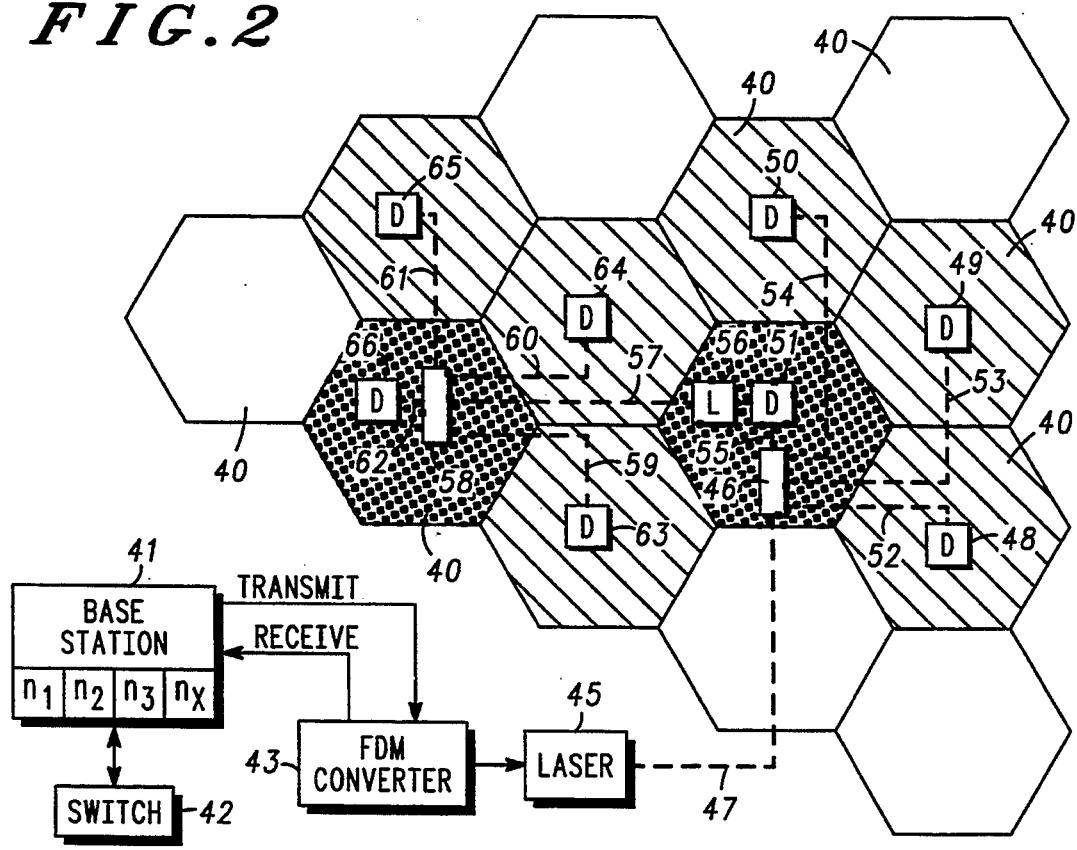
FIG. 2 is a system diagram of an optical communication downlink embodying the present invention.

Another example of the system downlink is provided in FIG. 2. FIG. 2 consists of a plurality of cells, or microcells, 40. Cells 40 which are shaded or cross-hatched are served from base station 41. Cells 40 which are cross-hatched are relay cells, as will be described below. Base station 41 contains a plurality of transceivers $n_1$-$n_x$, each capable of handling at least one communication channel. Base station 41 is coupled to a switch 42 for directing the input and output connections to transceivers $n_1$-$n_x$.

The input and output to base station 41 from cells 40 is conducted through an FDM converter 43. For the downlink portion, the output of converter 43 is transmitted to a laser 45 where it is converted into an optic signal. The optical signal is then transmitted to a splitter 46 along an optical cable 47. At splitter 47, the optical signal is divided into four equivalent optical signals. Each of the four optical signals is transmitted to one of detectors 48-51 along optic lines 52-55, respectively.

At detectors 48-51, the signals are reconverted to electrical signals and are generally transmitted to a remote unit, as in FIG. 1. The electrical signal from the detector, such as detector 51, may also be forwarded to a laser 56. Laser 56 will convert the received electrical signal into an optical signal for transmission over line 57 to splitter 58. Splitter 58 once again divides the optical signal into four signals and transmits these signals along optical lines 59-62 to detectors 63-66, respectively. Detectors 63-66 will then reconvert the optical signal to an electrical signal for transmission to the remote units, as shown in FIG. 1.

In the example of FIG. 2, the splitters are providing four output signals (n=4), which means than 0.25 (1/n) lasers are needed per cell site, on the downlink portion of the system. This is supported by FIG. 2 in that only 2 lasers are required to supply 8 cell sites, or 0.25 lasers per cell site.

In addition, when the base station is located at the cell site, it must be connected to the switch by backhauling. By allowing the base station to be remoted from the cell site, it can be placed in the same location as the switch, thereby reducing the cost of backhaul to the switch.

Referring now to FIGS. 3A-3D, block diagrams of various uplink circuits for use in the optical communication system are illustrated. In FIG. 3A, a block diagram of an uplink, generally designated 70, is illustrated. Uplink 70 shows a pair of transceivers, 71 and 72, which will receive transmitted RF signals. These RF signals are then transmitted to lasers 73 and 74, respectively, where the signals are converted into optical signals.

The optical signals are then transmitted to detectors 76 and 77, respectively, located at a combining station 75. At station 75, the electrical outputs from detectors 76 and 77 are combined in a combiner, such as multiplexer 78. The output of multiplexer 78 is transmitted to a laser 79 where the combined electrical signal is converted to an optical signal.

The output of laser 79 is transmitted to a detector 80 where it is again reconverted to a combined electrical signal. The combined electrical signal is then separated in a demultiplexer 81 into its constituent signals which are forwarded to the base station.

Referring now to FIG. 3B, a block diagram of a second uplink, generally designated 90, is illustrated. Uplink 90 differs from uplink 70 at the transceiver location. Instead of transceivers 71 and 72 transmitting their received signals directly to the lasers, the signals are first multiplexed in multiplexers 91 and 92, respectively.

The outputs of multiplexers 91 and 92 are then processed through the lasers (73 and 74) and detectors (76 and 77) as in FIG. 3A. However, since the signals have previously been multiplexed, the outputs from detectors 76 and 77 may be summed in combiner 78', rather than multiplexer 78 (FIG. 3A). The output of combiner 78' is then processed the same as in FIG. 3A.

Referring now to FIG. 3C, a block diagram of a third uplink, generally designated 95, is illustrated. Uplink 95 is similar to uplink 90 of FIG. 3B with the exception that detectors 76 and 77 and laser 79 have been eliminated. Rather than converting the optical signals to electrical signals for combining purposes, the optical signals are combined directly in combiner 78'. While this is more difficult to do, it provides a significant savings in the cost of the system by eliminating hardware.

In FIG. 3D, another example of uplink 95, uplink 95', is illustrated. In uplink 95' an additional combining station, 96, has been added to the system. Combining station 96 is provided to add another input to the signal being processed. This is accomplished by converting the optical inputs to electrical inputs in detectors 97 and 98. These signals are combined in combiner 99 and the combined output is converted to an optical signal by laser 100. The signal is then processed as before.

Figure 4:
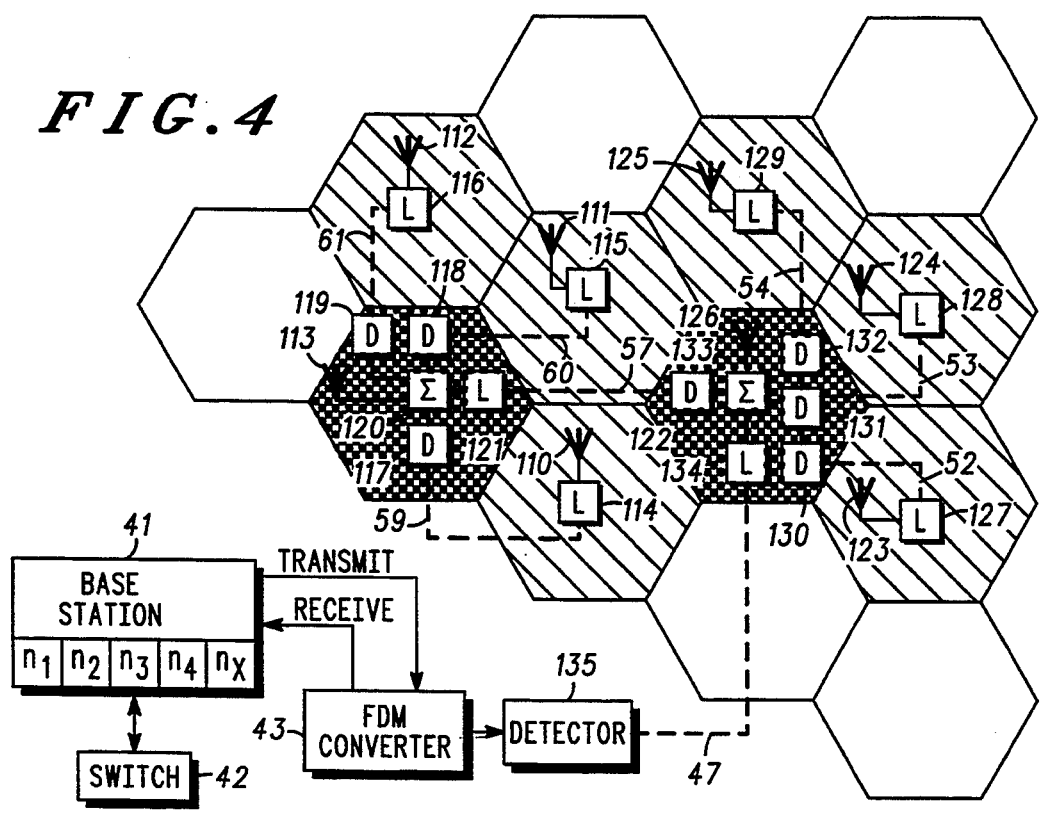
FIG. 4 is a system diagram of an optical communication uplink embodying the present invention.

An example of the system uplink is provided in FIG. 4. This system is the same as in FIG. 2 with the uplink shown instead of the downlink. In the system, RF signals are received at antenna 110-113. The signals received in non-relay cells are converted to optic signals in lasers 114-116 for transmission over optic cables 59-61, respectively.

The optical signals are received at the relay cell and reconverted to electrical signals in detectors 117-119. These signals are then combined with the signal received at antenna 113 in a combiner 120. The output from combiner 120 is transmitted to a laser 121 where it is converted to an optical signal and transmitted along optical cable 57 to the next relay cell.

The signal from laser 121 is then converted back to an electrical signal by a detector 122 where it is combined with other signals received by the relay cell. The additional non-relay cell signals are derived from signals received by antenna 123-125. These signals are converted in lasers 127-129 and transmitted to detectors 130-132 along lines 52-54, respectively. These signals are then combined with the signal received by antenna 126 of the relay cell and the signal received at detector 122 in a combiner 133.

The output of combiner 133 is converted to an optical signal and transmitted to a detector 135 along optic lines 47. Detector 135 then reconverts the optical signal to an electrical signal. The electrical signal is processed through converter 43 and forwarded to base station 41.

As illustrated in FIG. 4, each cell site contains a single laser. Therefore, for the uplink side of the system, the number of lasers required per cell size is one. Combining this with the number of lasers needed on the downlink side (1/n), and the number of lasers needed for the total system is 1+1/n per cell site. Therefore, by using the tree-branch network method, the required number of lasers is reduced from 2 to 1+1/n per site.

Figure 5:
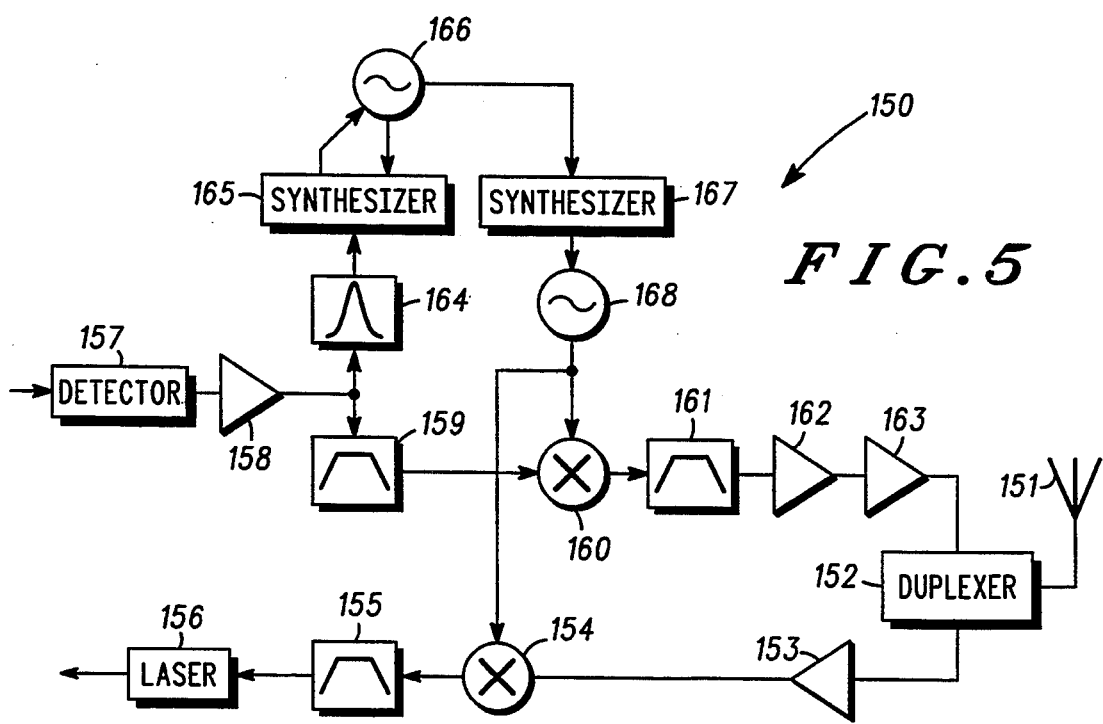
FIG. 5 is a block diagram of a cell schematic for use in an optical communication system embodying the present invention.

One method of implementing the present invention at a cell site is represented in the block diagram of a cell schematic, generally designated 150, of FIG. 5. Cell schematic 150 is for a non-relay cell site and, on the uplink side, consists of an antenna 151 for receiving RF signals. The received signals are transmitted to a pre-amplifier 153 through a duplexer 152.

The output of pre-amplifier 153 is then mixed with a timing adjustment signal, described below, in a mixer 154. The output of mixer 154 is filtered through an FDM filter 155 and converted to an optical signal by laser 156.

When circuit 150 is in the downlink mode, optical signals are received at detector 157. The optical signal is converted to an electrical signal and amplified in amplifier 158. The output of amplifier 158 is then filtered in an FDM filter 159 and mixed with the timing signal, described below in a mixer 160.

The corrected output from mixer 160 is then filtered in an FDM filter 161, processed through a low noise amplifier (LNA) 162 and a power amplifier (PA) 163. The output of PA 163 is passed through duplexer 152 and broadcast by antenna 151.

The timing adjustment signal input to mixers 154 and 160 is derived from the input signal. The output of amplifier 158 is split and used to drive a pilot signal generator 164. The output from pilot signal generator 164 is synthesized in a synthesizer 165 and fed to a reference oscillator 166 which provides feedback to synthesizer 165 and drives a second synthesizer 167. The output of synthesizer 167 is then used to control a voltage controlled oscillator (VCO) 168 which provides the timing adjustment signal to mixers 154 and 160.

Figure 6:
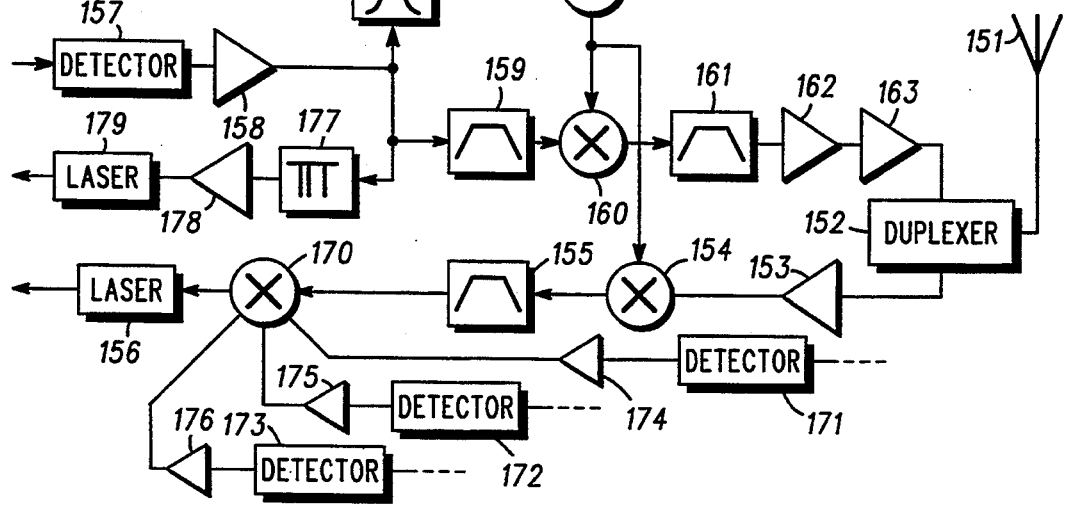
FIG. 6 is a block diagram of a relay cell schematic for use in an optical communication system embodying the present invention.

Referring now to FIG. 6, a block diagram of a relay cell schematic, generally designated 150', is illustrated. Schematic 150' is similar to schematic 150 with the addition of several other signals received from other remote cells. In the uplink side of the system, these other signals are to be combined with the signal received at antenna 151. This is accomplished in a combiner 170 after the signals have been converted from optical signals to electrical signals in detectors 171-173. The converted signals are then amplified in amplifiers 174-176 before summing with the output of filter 175 in combiner 170. The combined signal is then converted in laser 156 and transmitted to the next stage.

In addition, this relay cell may not be the last cell in the downlink distribution. Therefore, the received signal, after being amplified in amplifier 158, is processed through a notch filter 177. The filtered signal is then amplified in an amplifier 178 and converted to an optical signal in a laser 179 before being transmitted to the next stage.

The above optical distribution system can also serve to reduce the number of transceivers needed in a system. Most service providers need to have enough transceivers at a site to handle calls during peak times. That means some transceivers at each site are idle when the system is not at peak loading. By co-locating the transceivers from various sites into one site, excess capacity form one site can be handled by transceivers which would have been at another site. This permits the system provider to use fewer transceivers to handle the same number of system calls.

Thus, it will be apparent to one skilled in the art that there has been provided in accordance with the invention, an optical distribution system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. An optical distribution system having an uplink portion, downlink portion and a transceiver, said transceiver comprising:

antenna means for one of receiving and transmitting an RF signal;

duplexing means coupled to said antenna for one of coupling a downlink signal received from said downlink portion to said antenna and coupling an uplink signal received form said antenna to said uplink portion, said duplex means having an input and an output;

first mixing means for combining said uplink signal with a timing adjustment signal, said first mixing means having a first input coupled to said output of said duplexing means, a second input coupled to receive said timing adjustment signal, and an output;

first transducer means for converting an electrical signal to an optical signal, said first transducer means having an input coupled to said output of said first mixing means and an output coupled to said uplink portion;

first detector means for converting an optical signal to an electrical signal, said first detector means having an input coupled to said downlink portion and an output;

second mixing means for combining said downlink signal with said timing adjustment signal, said second mixing means having a first input coupled to said output of said first detector means, a second input coupled to receive said timing adjustment signal, and an output coupled to said input of said duplexing means;

a pilot having an input coupled to said output of said first detector means and an output;

first synthesizer means for synthesizing a signal, said first synthesizer means having an input coupled to said output of said pilot, an output, and a feedback input;

oscillator means for providing an oscillating signal, said oscillator means having an input coupled to said output of said first synthesizer, a feedback output coupled to said feedback input of said first synthesizer, and an output;

second synthesizer means for synthesizing a signal, said second synthesizer means having an input coupled to said output of said oscillating means and an output; and a voltage controlled oscillator having an input coupled to said output of said second synthesizer and an output coupled to said second inputs of said first and second mixing means.

2. The transceiver of the optical distribution system of claim 1 further comprising:

a pre-amplifier having an input coupled to said output of said duplexer and an output coupled to said first input of said first mixing means; and filter means for filtering a signal, said filter means having an input coupled to said output of said first mixing means and an output coupled to said input of said first transducer means.

3. The transceiver of the optical distribution system of claim 1 further comprising:

first filter means for filtering a signal, said first filter means having an input coupled to said output of said first detector means and an output coupled to said first input of said second mixing means;

second filter means for filtering a signal, said second filter means having an input coupled to said output of said second mixing means and an output;

a low noise amplifier having an input coupled to said output of said second filter means and an output; and a power amplifier having an input coupled to said output of said low noise amplifier and an output coupled to said input of said duplexing means.

4. The transceiver of the optical distribution system of claim 1 further comprising:

summing means for combining a plurality of signals, said summing means having a first input coupled to said output of said first mixing means, a second input, and an output coupled to said input of said first transducer means; and second detector means for converting an optical signal to an electrical signal, said second detector having an output coupled to said second input of said summing means.

5. The transceiver of the optical distribution system of claim 1 further comprising:

a notch filter having an input coupled to said output of said first detector means and an output; and second transducer means for converting an electrical signal to an optical signal, said second transducer having an input coupled to said output of said notch filter.

6. An optical distribution system having an uplink portion, downlink portion and a transceiver, said transceiver comprising:

antenna means for one of receiving and transmitting an RF signal;

duplexing means coupled to said antenna for one of coupling a downlink signal received from said downlink portion to said antenna and coupling an uplink signal received form said antenna to said uplink portion, said duplex means having an input and an output;

first mixing means for combining said uplink signal with a timing adjustment signal, said first mixing means having a first input coupled to said output of said duplexing means, a second input coupled to receive said timing adjustment means, and an output;

first transducer means for converting an electrical signal to an optical signal, said first transducer means having an input coupled to said output of said first mixing means and an output coupled to said uplink portion;

first detector means for converting an optical signal to an electrical signal, said first detector means having an input coupled to said downlink portion and an output;

a notch filter having an input coupled to said output of said first detector means and an output;

second mixing means for combining said downlink signal with said timing adjustment signal, said second mixing means having a first input coupled to said output of said notch filter, a second input coupled to receive said timing adjustment signal, and an output coupled to said input of said duplexing means; and second transducer means for converting an electrical signal to an optical signal, said second transducer having an input coupled to said output of said notch filter.

7. The transceiver of the optical distribution system of claim 6 further comprising:

a pre-amplifier having an input coupled to said output of said duplexer and an output coupled to said first input of said first mixing means; and filter means for filtering a signal, said filter means having an input coupled to said output of said first mixing means and an output coupled to said input of said first transducer means.

8. The transceiver of the optical distribution system of claim 6 further comprising:

first filter means for filtering a signal, said first filter means having an input coupled to said output of said second mixing means and an output;

a low noise amplifier having an input coupled to said output of said first filter means and an output; and a power amplifier having an input coupled to said output of said low noise amplifier and an output coupled to said input of said duplexing means.

9. The transceiver of the optical distribution system of claim 6 further comprising:

a pilot having an input coupled to said output of said first detector means and an output;

first synthesizer means for synthesizing a signal, said first synthesizer means having an input coupled to said output of said pilot, an output, and a feedback input;

oscillator means for providing an oscillating signal, said oscillator means having an input coupled to said output of said first synthesizer, a feedback output coupled to said feedback input of said first synthesizer, and an output;

second synthesizer means for synthesizing a signal, said second synthesizer means having an input coupled to said output of said oscillating means and an output; and a voltage controlled oscillator having an input coupled to said output of said second synthesizer and an output coupled to said second inputs of said first and second mixing means.

10. The transceiver of the optical distribution system of claim 6 further comprising:

summing means for combining a plurality of signals, said summing means having a first input coupled to said output of said first mixing means, a second input, and an output coupled to said input of said first transducer means; and second detector means for converting an optical signal to an electrical signal, said second detector having an output coupled to said second input of said summing means.

* * * * *